(12) United States Patent
Thune, Jr.

(10) Patent No.: US 7,249,550 B1
(45) Date of Patent: Jul. 31, 2007

(54) CULINARY CUTTING TOOL

(76) Inventor: Daniel Thune, Jr., 7312 Betz Ave., Sparrows Point, MD (US) 21219

( * ) Notice: Subject to any disclaimer, the term of this patent is extended or adjusted under 35 U.S.C. 154(b) by 0 days.

(21) Appl. No.: 11/400,112

(22) Filed: Apr. 10, 2006

(51) Int. Cl.
*B26D 1/30* (2006.01)
*A21C 5/00* (2006.01)

(52) U.S. Cl. .................. 83/599; 83/597; 83/651.1; 30/114

(58) Field of Classification Search .............. 30/114, 30/115, 116, 117; 83/597, 599, 651.1; 99/537
See application file for complete search history.

(56) References Cited

U.S. PATENT DOCUMENTS

| | | | |
|---|---|---|---|
| D85,385 S | * | 10/1931 | Lowitz .................. D7/673 |
| 2,114,277 A | | 4/1938 | Bloomfield |
| 2,472,699 A | * | 6/1949 | Gangemi ................ 83/651.1 |
| 2,550,166 A | | 4/1951 | Sargent |
| 2,592,657 A | * | 4/1952 | Owen .................... 83/543 |
| 2,824,588 A | | 2/1958 | Lyon et al. |
| 3,094,062 A | | 6/1963 | Boeke |
| 3,561,511 A | * | 2/1971 | Kummer .................. 83/597 |
| 4,383,365 A | * | 5/1983 | Metzigian ................ 30/114 |
| 4,599,928 A | * | 7/1986 | Oker .................... 83/581.1 |
| D308,803 S | | 6/1990 | Horton et al. |
| 5,035,056 A | | 7/1991 | Sheffield |
| D375,661 S | | 11/1996 | Ross et al. |
| 6,805,032 B2 | * | 10/2004 | Engdahl ................ 83/597 |

* cited by examiner

*Primary Examiner*—Hwei-Siu C. Payer

(57) ABSTRACT

A culinary tool includes a base member that has a planar bottom surface and an arcuate top surface for fitting an entire roll of cookie dough thereon. The top surface is contoured symmetrically to an outer surface of the roll of cookie dough. The base member has oppositely seated longitudinal sides equidistantly spaced from the longitudinal axis thereof. The base member is provided with grooves equidistantly spaced along a length thereof. The grooves traverse a length of the roll of cookie dough, extend downwardly from the top surface, and terminate above the bottom surface. A slicing section is pivotally conjoined to opposed base member ends, is rearwardly offset from a base member center, and is repeatedly pivotal along a fulcrum axis such that the slicing section penetrates through the grooves so that the roll of cookie dough becomes completely severed into disc-shaped segments defined by the grooves.

12 Claims, 4 Drawing Sheets

CULINARY CUTTING TOOL

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to culinary tools and, more particularly, to a culinary cutting tool for slicing a cylindrical roll of cookie dough.

2. Prior Art

During culinary preparation of various food types the need often arises to cut or slice certain food items into manageable pieces. One food item that requires such slicing is a pre-made roll of cookie dough that can be bought at virtually any grocery or food store. The most obvious means of doing so is to use a sharp knife to cut the roll of dough into slices. As with other cutting procedures though, the food preparer runs the risk of cutting themselves while cutting the dough, and cutting an entire roll of dough with a knife can be time consuming. Furthermore, when cutting with a knife, equally sized and shapes slices are not obtained, resulting in cookies that have a wide range of shapes and sizes, which may be undesirable for display purposes.

Various food item cutters are known in the prior art. More specifically, one prior art example shows a type of cheese cutter that includes a single thin wire tautly mounted in a suitable frame, and a handle which is grasped by the user while manipulating the frame and wire to cut slices off a block of cheese. Although such a cutter eliminates the risk of the user cutting themselves they are still only able to cut one slice at a time. Also, evenly sized slices cannot be obtained with such a cutter.

Another prior art example shows a cutter used primarily for slicing hard boiled eggs. Such a cutter includes a bottom support piece configured to accept a hard boiled egg therein, and a top piece that has a plurality of spaced, parallel disposed taut thin wires. The top piece is hingedly mounted to the bottom piece, and the hard boiled egg is cut into a plurality of slices when the hinged top piece is pushed down on the egg. This example does allow for multiple evenly sized slices, but is not properly configured for slicing a roll of pre-made cookie dough.

Accordingly, a need remains for a culinary cutting tool in order to overcome the above-noted shortcomings. The present invention satisfies such a need by providing a cutting tool that is convenient and easy to use, greatly reduces the user's risk of cutting themselves, saves a considerable amount of time and energy, and provides evenly sized and shaped slices of cookie. Such a cookie dough cutter allows a user to quickly prepare a roll of cookie dough for baking, which is particularly appealing to parents or bakery owners with a busy schedule. The evenly shaped slices also ensure that the resulting cookies will be uniform in shapes, thus improving the appearance of a freshly baked batch of cookies.

BRIEF SUMMARY OF THE INVENTION

In view of the foregoing background, it is therefore an object of the present invention to provide a culinary cutting tool. These and other objects, features, and advantages of the invention are provided by a culinary tool for slicing a cylindrical roll of cookie dough.

The culinary tool includes a base member that has a planar bottom surface and an arcuate top surface arranged in such a manner that the entire cylindrical roll of cookie dough conveniently and effectively fits thereon. Such an arcuate top surface is contoured symmetrically to an outer surface of the cylindrical roll of cookie dough such that a longitudinal axis of the cylindrical roll of cookie dough effectively lays along a horizontal plane and parallel to a longitudinal axis of the base member during slicing operations.

The base member also has oppositely seated longitudinal sides equidistantly spaced from the longitudinal axis thereof. Such a base member is provided with a plurality of grooves equidistantly spaced along the longitudinal length thereof. The grooves traverse the longitudinal length of the cylindrical roll of cookie dough. Such grooves extend downwardly from the arcuate top surface and terminate at a location above the bottom surface.

A slicing section is pivotally conjoined directly to axially opposed ends of the base member. Such a slicing section is rearwardly offset from a center of the base member and is repeatedly pivotal along a fulcrum axis registered parallel to the longitudinal axis of the base member such that the slicing section effectively penetrates downwardly through the grooves and stops adjacent to a the bottom surface of the base member so that the cylindrical roll of cookie dough advantageously becomes completely severed into a plurality of disc-shaped segments defined by the grooves. The slicing section may include a unitary and U-shaped handle that has opposed ends directly connected to the ends of the base member. Such a handle preferably lies subjacent to the arcuate top surface when the slicing section is biased to the lowered position.

First and second anchor rods have axially opposed ends statically and directly connected to the U-shaped handle and registered parallel to the longitudinal axis of the base member. A plurality of equidistantly spaced slicing implements have axially opposed end portions permanently affixed directly to the first and second anchor rods. Such slicing implements have a fixed spatial relationship equal to a fixed spatial relationship of the grooves such that the slicing implements conveniently and effectively enter corresponding ones of the grooves when the slicing section is pivoted to the lowered position. The slicing implements may include a plurality of non-corrosive wires. Each of the wires has a fixed longitudinal length greater than a diameter of the arcuate top surface. Each of the wires preferably has an equal tension for advantageously uniformly slicing the cylindrical roll of cookie dough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
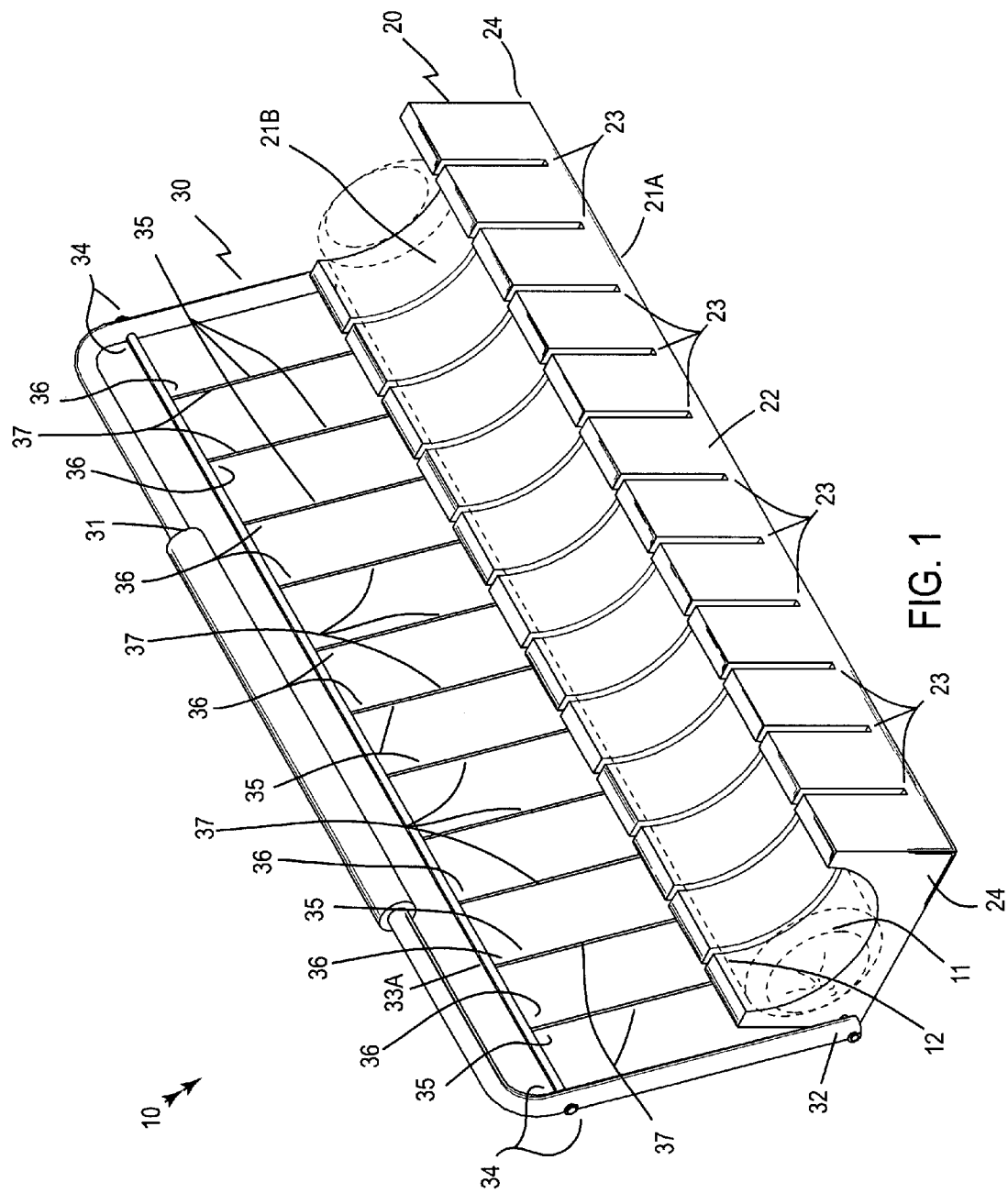
FIG. 1 is a perspective view showing a culinary cutting tool, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-5 by the reference numeral 10 and is intended to provide a culinary cutting tool. It should be understood that the apparatus 10 may be used to cut many different types of food items, and should not be limited in use to only cutting cylindrical rolls of pre-made cookie dough.

Referring initially to FIGS. 1, 2, 3, 4 and 5, the apparatus 10 includes a base member 20 that has a planar bottom surface 21A and an arcuate top surface 21B arranged in such a manner that the entire cylindrical roll of cookie dough 11 conveniently and effectively fits thereon, as is best shown in FIG. 1. This is an important feature for ensuring that the entire roll of cookie dough 11 can quickly and easily be cut in one motion. Of course, a variety of other food items may be placed on the top surface 21B in order to be sliced, as is obvious to a person of ordinary skill in the art. Such an arcuate top surface 21B is contoured symmetrically to an outer surface 12 of the cylindrical roll of cookie dough 11 such that a longitudinal axis of the cylindrical roll of cookie dough 11 effectively lays along a horizontal plane and parallel to a longitudinal axis of the base member 20 during slicing operations.

The base member 20 also has oppositely seated longitudinal sides 22 equidistantly spaced from the longitudinal axis thereof. Such a base member 20 is provided with a plurality of grooves 23 equidistantly spaced along the longitudinal length thereof. The grooves 23 traverse the longitudinal length of the cylindrical roll of cookie dough 11. Such grooves 23 extend downwardly from the arcuate top surface 21B and terminate at a location above the bottom surface 21A. Of course, the bottom surface 23 may be provided with suction cups or a non-skid material for advantageously preventing the apparatus 10 from unexpectedly shifting during operating conditions, as is obvious to a person of ordinary skill in the art.

Again referring to FIGS. 1 through 5, a slicing section 30 is pivotally conjoined directly, without the use of intervening elements, to axially opposed ends 24 of the base member 20. Such a slicing section 30 is rearwardly offset from a center of the base member 20 and is repeatedly pivotal along a fulcrum axis registered parallel to the longitudinal axis of the base member 20, which is essential such that the slicing section 30 effectively penetrates downwardly through the grooves 23 and stops adjacent to a the bottom surface 21A of the base member 20 so that the cylindrical roll of cookie dough 11 advantageously becomes completely severed into a plurality of disc-shaped segments defined by the grooves 23. The slicing section 30 includes a unitary and U-shaped handle 31 that has opposed ends 32 directly connected, without the use of intervening elements, to the ends 24 of the base member 20. Such a handle 31 lies subjacent to the arcuate top surface 21B when the slicing section 30 is biased to the lowered position, as us illustrated in FIGS. 3, 4 and 5.

Figure 2:
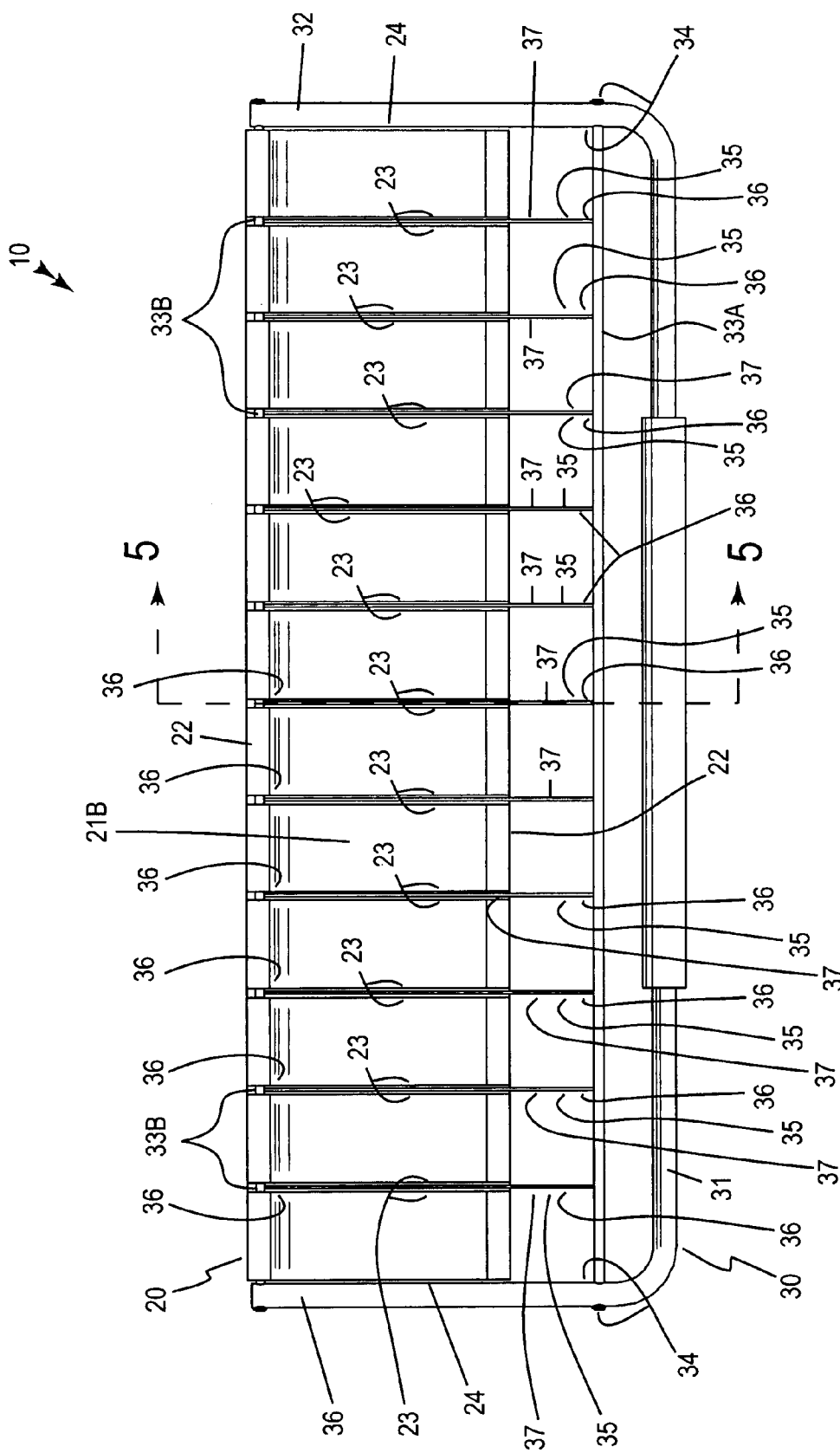
FIG. 2 is a top plan view of the apparatus shown in FIG. 1.
Figure 3:
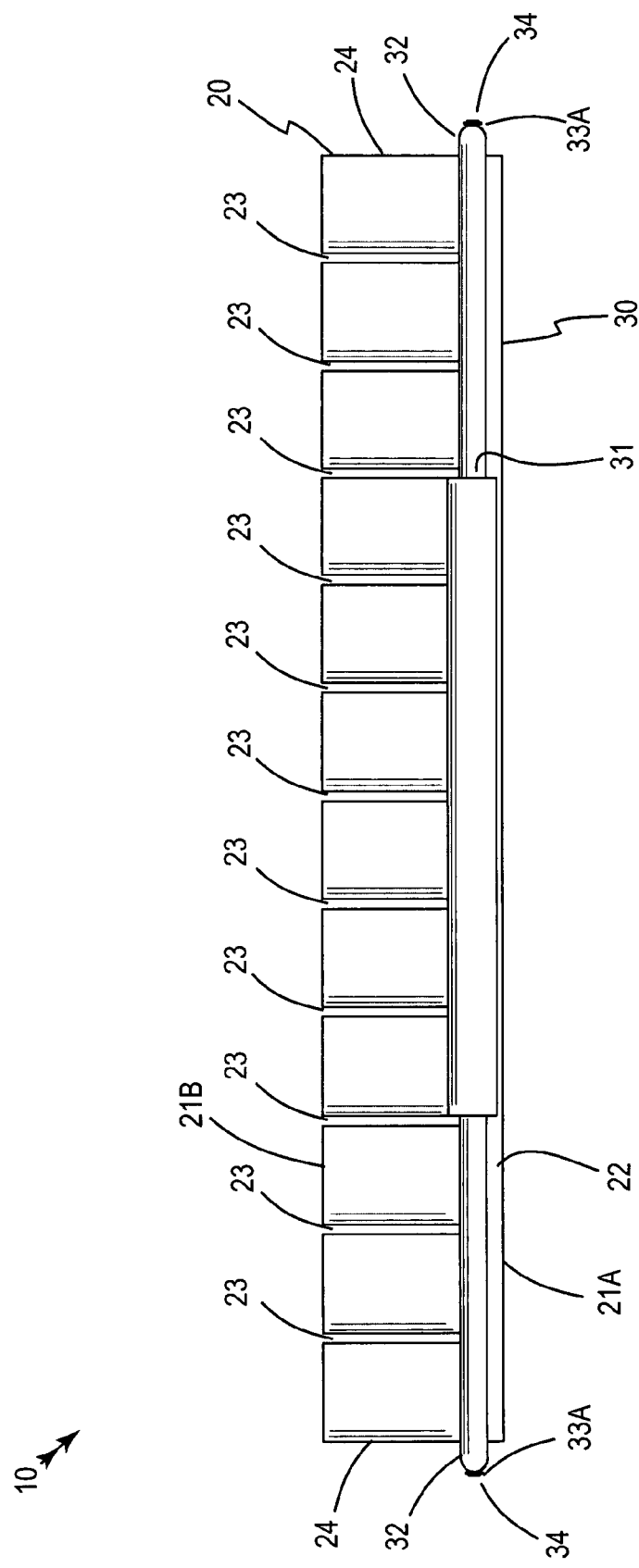
FIG. 3 is a front-elevational view of the apparatus shown in FIG. 2, showing the handle pivoted to a lowered position.
Figure 4:
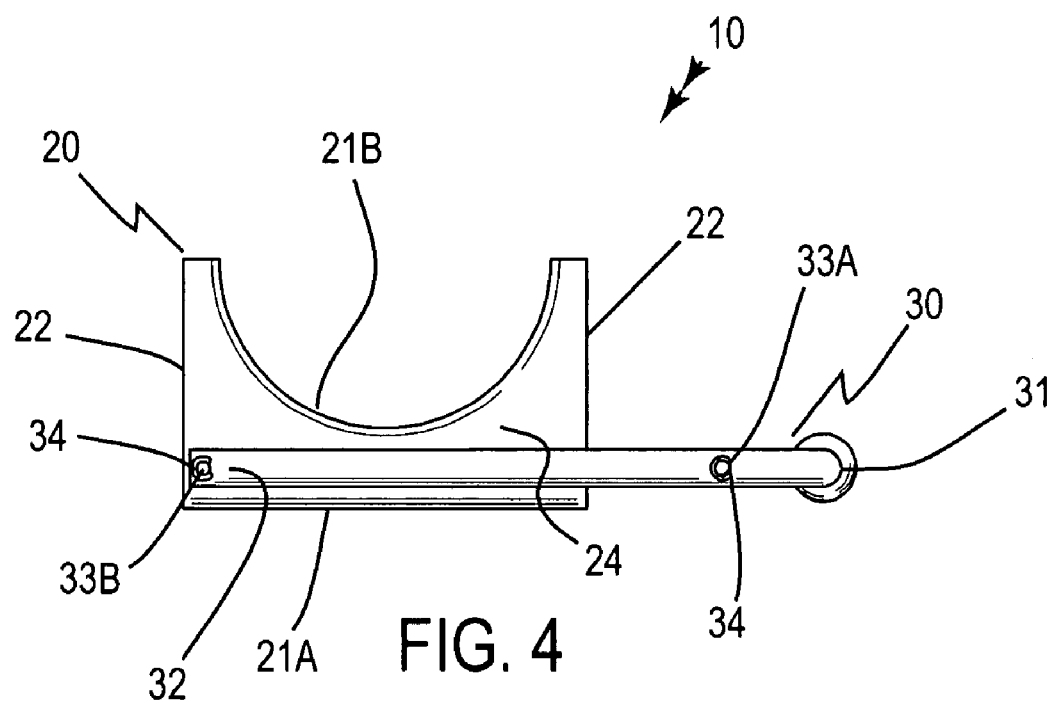
FIG. 4 is a side-elevational view of the apparatus shown in FIG. 3.
Figure 5:
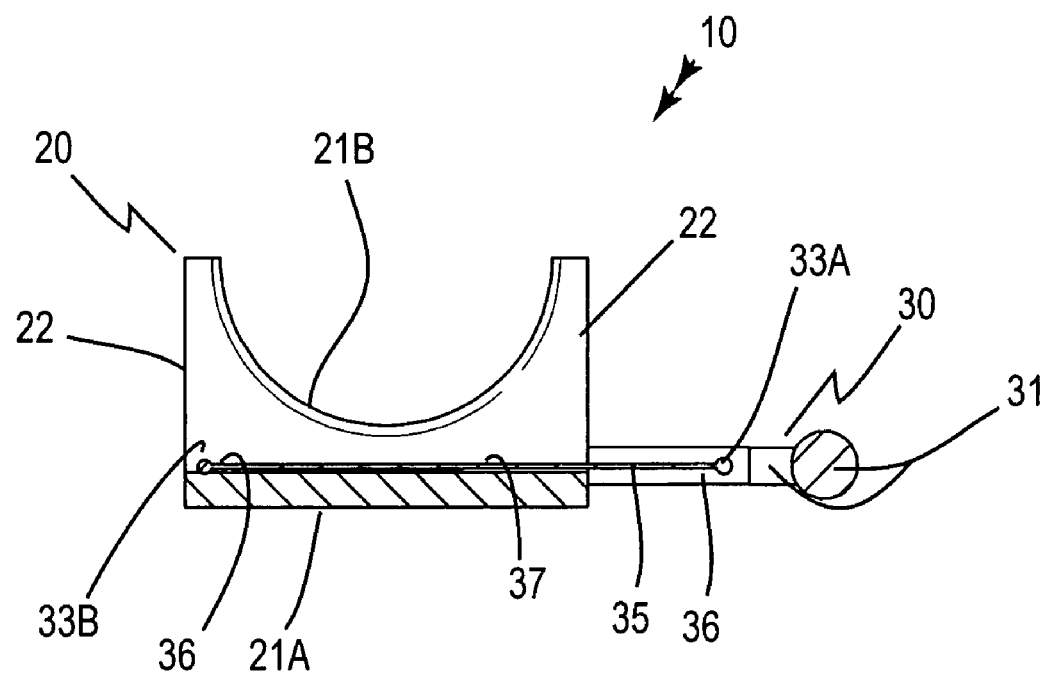
FIG. 5 is a cross-sectional view of the apparatus shown in FIG. 2, taken along line 5-5.

Still referring to FIGS. 1 through 5, first 33A and second 33B anchor rods have axially opposed ends 34 statically and directly connected, without the use of intervening elements, to the U-shaped handle 31 and registered parallel to the longitudinal axis of the base member 20. A plurality of equidistantly spaced slicing implements 35 have axially opposed end portions 36 permanently affixed directly, without the use of intervening elements, to the first 33A and second 33B anchor rods. Such slicing implements 35 have a fixed spatial relationship equal to a fixed spatial relationship of the grooves 23, which is crucial such that the slicing implements 35 conveniently and effectively enter corresponding ones of the grooves 23 when the slicing section 30 is pivoted to the lowered position, as is best shown in FIG. 2. The slicing implements 35 include a plurality of non-corrosive wires 37. Each of the wires 37 has a fixed longitudinal length greater than a diameter of the arcuate top surface 21B, which is important for allowing the wires 37 to span across an entire width of the top surface 21B when the slicing section 30 is pivoted to a lowered position. Each of the wires 37 also has an equal tension that is critical for advantageously uniformly slicing the cylindrical roll of cookie dough 11.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A culinary tool for slicing a cylindrical roll of cookie dough, said culinary tool comprising:
    a base member having a planar bottom surface and an arcuate top surface arranged in such a manner that the entire cylindrical roll of cookie dough fits thereon, said arcuate top surface being contoured symmetrically to an outer surface of the cylindrical roll of cookie dough such that a longitudinal axis of the cylindrical roll of cookie dough lays along a horizontal plane and parallel to a longitudinal axis of said base member during slicing operations, said base member being provided with a plurality of grooves equidistantly spaced along the longitudinal length thereof, said grooves traverses the longitudinal length of the cylindrical roll of cookie dough; and
    a slicing section pivotally conjoined directly to axially opposed ends of said base member, said slicing section being rearwardly offset from a center of said base member and being repeatedly pivotal along a fulcrum axis registered parallel to the longitudinal axis of said base member such that said slicing section penetrates downwardly through said grooves and stops adjacent to said bottom surface of said base member so that the cylindrical roll of cookie dough becomes completely severed into a plurality of disc-shaped segments defined by said grooves;
    wherein said slicing section comprises
    a unitary and U-shaped handle having opposed ends directly connected to said ends of said base member;
    first and second anchor rods having axially opposed ends statically and directly connected to said U-shaped handle and registered parallel to the longitudinal axis of said base member; and
    a plurality of equidistantly spaced slicing implements having axially opposed end portions permanently affixed directly to said first and second anchor rods, said slicing implements having a fixed spatial relationship equal to a fixed spatial relationship of said grooves such that said slicing implements enter corresponding ones of said grooves when said slicing section is pivoted to a lowered position.

2. The tool of claim 1, wherein said slicing implements comprise: a plurality of non-corrosive wires, each of said wires having a fixed longitudinal length greater than a diameter of said arcuate top surface.

3. The tool of claim 2, wherein each of said wires have an equal tension for uniformly slicing the cylindrical roll of cookie dough.

4. The tool of claim 1, wherein said handle lies subjacent said arcuate top surface when said slicing section is pivoted to the lowered position.

5. A culinary tool for slicing a cylindrical roll of cookie dough, said culinary tool comprising:
    a base member having a planar bottom surface and an arcuate top surface arranged in such a manner that the entire cylindrical roll of cookie dough fits thereon, said arcuate top surface being contoured symmetrically to an outer surface of the cylindrical roll of cookie dough such that a longitudinal axis of the cylindrical roll of cookie dough lays along a horizontal plane and parallel to a longitudinal axis of said base member during slicing operations, wherein said base member has oppositely seated longitudinal sides equidistantly spaced from the longitudinal axis thereof, said base member being provided with a plurality of grooves equidistantly spaced along the longitudinal length thereof, said grooves traverses the longitudinal length of the cylindrical roll of cookie dough; and
    a slicing section pivotally conjoined directly to axially opposed ends of said base member, said slicing section being rearwardly offset from a center of said base member and being repeatedly pivotal along a fulcrum axis registered parallel to the longitudinal axis of said base member such that said slicing section penetrates downwardly through said grooves and stops adjacent to said bottom surface of said base member so that the cylindrical roll of cookie dough becomes completely severed into a plurality of disc-shaped segments defined by said grooves;
    wherein said slicing section comprises
    a unitary and U-shaped handle having opposed ends directly connected to said ends of said base member;
    first and second anchor rods having axially opposed ends statically and directly connected to said U-shaped handle and registered parallel to the longitudinal axis of said base member; and
    a plurality of equidistantly spaced slicing implements having axially opposed end portions permanently affixed directly to said first and second anchor rods, said slicing implements having a fixed spatial relationship equal to a fixed spatial relationship of said grooves such that said slicing implements enter corresponding ones of said grooves when said slicing section is pivoted to a lowered position.

6. The tool of claim 5, wherein said slicing implements comprise: a plurality of non-corrosive wires, each of said wires having a fixed longitudinal length greater than a diameter of said arcuate top surface.

7. The tool of claim 6, wherein each of said wires have an equal tension for uniformly slicing the cylindrical roll of cookie dough.

8. The tool of claim 5, wherein said handle lies subjacent said arcuate top surface when said slicing section is pivoted to the lowered position.

9. A culinary tool for slicing a cylindrical roll of cookie dough, said culinary tool comprising:
    a base member having a planar bottom surface and an arcuate top surface arranged in such a manner that the entire cylindrical roll of cookie dough fits thereon, said arcuate top surface being contoured symmetrically to an outer surface of the cylindrical roll of cookie dough such that a longitudinal axis of the cylindrical roll of cookie dough lays along a horizontal plane and parallel to a longitudinal axis of said base member during slicing operations, wherein said base member has oppositely seated longitudinal sides equidistantly spaced from the longitudinal axis thereof, said base member being provided with a plurality of grooves equidistantly spaced along the longitudinal length thereof, said grooves traverses the longitudinal length of the cylindrical roll of cookie dough, wherein said grooves extend downwardly from said arcuate top surface and terminate at a location above said bottom surface; and
    a slicing section pivotally conjoined directly to axially opposed ends of said base member, said slicing section being rearwardly offset from a center of said base member and being repeatedly pivotal along a fulcrum axis registered parallel to the longitudinal axis of said base member such that said slicing section penetrates downwardly through said grooves and stops adjacent to said bottom surface of said base member so that the cylindrical roll of cookie dough becomes completely severed into a plurality of disc-shaped segments defined by said grooves.

wherein said slicing section comprises:

a unitary and U-shaped handle having opposed ends directly connected to said ends of said base member;

first and second anchor rods having axially opposed ends statically and directly connected to said U-shaped handle and registered parallel to the longitudinal axis of said base member; and a plurality of equidistantly spaced slicing implements having axially opposed end portions permanently affixed directly to said first and second anchor rods, said slicing implements having a fixed spatial relationship equal to a fixed spatial relationship of said grooves such that said slicing implements enter corresponding ones of said grooves when said slicing section is pivoted to a lowered position;

wherein said first and second anchor rods are directly mated with vertical sides of said U-shaped handle, said first anchor rod passing through said base member while said second anchor rod remains spaced from said base member.

10. The tool of claim 9, wherein said slicing implements comprise: a plurality of non-corrosive wires, each of said wires having a fixed longitudinal length greater than a diameter of said arcuate top surface.

11. The tool of claim 10, wherein each of said wires have an equal tension for uniformly slicing the cylindrical roll of cookie dough.

12. The tool of claim 9, wherein said handle lies subjacent said arcuate top surface when said slicing section is pivoted to the lowered position.

* * * * *